United States Patent
Andarawis et al.

(12) United States Patent (10) Patent No.: US 6,452,164 B1
(45) Date of Patent: Sep. 17, 2002

(54) APPARATUS AND METHOD FOR CALIBRATING GAMMA CAMERAS

(75) Inventors: Emad Andarawis Andarawis, Clifton Park; Paul Andrew Frank, Albany; Shankar Visranathan Guru; Ahmad Nadeem Ishaque, both of Clifton Park, all of NY (US); Douglas Ray Powell, Burlington, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/522,573

(22) Filed: Mar. 10, 2000

(51) Int. Cl.⁷ ............................................... G01T 1/208
(52) U.S. Cl. ................. 250/252.1; 250/363.09
(58) Field of Search .................. 250/252.1, 363.09, 250/369, 363.07

(56) References Cited

U.S. PATENT DOCUMENTS 4,079,257 A * 3/1978 Jatteau et al. .......... 250/363.09
6,140,650 A * 10/2000 Berlad ................... 250/363.09

* cited by examiner

Primary Examiner—Georgia Epps
Assistant Examiner—Richard Hanig
(74) Attorney, Agent, or Firm—John F. Thompson; Jill M. Breedlove (57) ABSTRACT

An apparatus and method used to calibrate a gamma camera include an energy source and intensity selector and an energy weighting device. The energy source provides an energy output, such as an electrical current. The intensity selector is connected to the energy source and adjusts the energy output to a predetermined energy level that corresponds to an intensity of a predetermined radioactive source. The energy weighting device is also connected to the energy source and gamma camera, and the spatial compensator creates calibration signals from the energy output of the energy source. The calibration signals are supplied to the gamma camera and used during calibration of the gamma camera in lieu of energy signals produced by the gamma camera in response to a radioactive source.

26 Claims, 6 Drawing Sheets

APPARATUS AND METHOD FOR CALIBRATING GAMMA CAMERAS

BACKGROUND OF THE INVENTION

The present invention relates to an apparatus and method for calibrating gamma cameras and more particularly to an apparatus and method for calibrating gamma cameras using an electronic source.

Gamma cameras are used in medical and other devices, typically, to detect the intensity and the spatial position of radioactive energy. In medical devices, the gamma camera detects radioactive energy from radioactive materials that have been placed by medical personnel in, for example, the blood stream of a patient for performing medical tests and imaging of various vital organs.

The gamma camera typically includes a gamma camera detector having a scintillation crystal that is positioned above an array of photo-multipliers. The scintillation crystal absorbs the radioactive energy from the radioactive materials. The absorbed radioactive energy is converted into energy signals that can be detected by the array of photo-multipliers. The detected energy signal is converted into an electrical signal by the array of photo-multipliers. Typically, the array of photomultipliers is connected to a resistor matrix that provides a ratio of displacement signals and intensity signals based on the intensity and spatial position of the radioactive material in relation to the array of photo-multipliers. The resistor matrix is connected to various electronics that interpret the ratio of displacement signals and the intensity signals to provide a video display and/or image of the medial test being performed.

From time to time, the gamma camera is calibrated to ensure the readings measured and data collected by the gamma camera are accurate. The calibration typically adjusts the spatial gain and offset of the array of photo-multipliers and other electronics to account for any environmentally caused electronic drift. Currently, skilled technicians perform the calibration by using several radioactive sources having varying radioactive intensities, such as, for example, americium (Am), cobalt (Co) and technetium (Tc). During the calibration, the technician places the radioactive sources on the scintillation crystal at various predefined locations that correspond to specific displacement signal to intensity signal ratios. At these predefined locations, the technician measures the signal ratios, and the gamma camera is adjusted such that the measured signal ratios are accurate.

The use of radioactive sources during the calibration presents many problems. For example, the storage and transportation of the radioactive sources are regulated by governmental agencies and strict compliance with the regulations enforced by these governmental agencies is required. Compliance with the governmental regulations increases the cost of the calibration. Typically, in order to perform the calibration of the gamma camera, a technician must travel to the facility where the gamma camera is physically located. As such, the technician must transport the radioactive source to perform the calibration. During transit, the technician must comply with the governmental regulations that concern storing and transporting the radioactive sources. Since compliance with the regulation is expensive, the cost of the calibration is increased simply because the technician must transport and store the radioactive sources for calibration. Therefore, a method and apparatus for calibrating the gamma cameras is desired that eliminates or reduces the use of radioactive sources and, thus, eliminates and/or reduces the costs associated with the storage and transportation of the radioactive sources.

In addition, since the cost of calibrating the gamma camera is high because the radioactive sources are necessary, the gamma cameras are calibrated less frequently. Infrequent calibration presents many problems, such as inaccurate readings and incorrect operation of the device. As such, it is desired that the calibration of the gamma camera be performed frequently. Therefore, an apparatus and method for calibrating gamma cameras is desired such that the gamma camera can be frequently calibrated at a reasonable cost.

BRIEF SUMMARY OF THE INVENTION

In one exemplary embodiment, an electronic source used during calibration of a gamma camera is provided. In this embodiment, the gamma camera includes a scintillation crystal that is positioned above a photo-multiplier. A preamplifier is connected to the photo-multiplier, and the pre-amplifier includes an electrical output. The electronic source used during calibration of the gamma camera comprises a current source. A predetermined current signal is produced by the current source, and the predetermined current signal is representative of an intensity produced by the photo-multiplier when subjected to gamma radiation from a predetermined radioactive event that is positioned proximate to the scintillation crystal. An intensity selection switch is connected to the current source, and the intensity selection switch is adjustable to a conductive position. A reference current setting is also connected to the intensity selection switch. When the intensity selection switch is adjusted to the conductive position, the reference current setting is supplied to the current source and instructs the current source to produce the predetermined current signal.

A position selector switch is also connected to the current source to receive the predetermined current signal. The position selector switch comprises a plurality of connective positions, and a first of the plurality of connective positions supplies the predetermined current signal to a first output of the electronic source. A first potentiometer is connected to a second of the plurality of connective positions and produces a first ratio of current signals from the predetermined current signal. The first ratio of current signals is supplied to a second output of the electronic source. A second potentiometer is connected to a third of the plurality of connective positions and produces a second ratio of current signals from the predetermined current signal. The second ratio of current signals is supplied to a third output of the electronic source. The first output, the second output and the third output are connected to replace the electrical output of the pre-amplifier during calibration of the gamma camera. In addition, the first output, the second output and the third output, respectively, supply the predetermined current signal, the first ratio of current signals and the second ratio of current signals, respectively, in lieu of energy signals produced by the gamma camera in response to a radioactive source during calibration.

An exemplary method of calibrating a gamma camera comprises determining the intensity produced by the photo-multiplier when subjected to gamma radiation from a radioactive event proximate to the scintillation crystal. An x-axis displacement signal is determined that corresponds to an x-axis position of the radioactive event proximate to the scintillation crystal. In addition, a y-axis displacement signal is determined that corresponds to a y-axis position of the radioactive event proximate to the scintillation crystal.

The electronic source is connected to replace the electrical output of the pre-amplifier. The electronic source is set to a center energy level that is substantially equal to the intensity produced by the photo-multiplier when subjected to gamma radiation from the radioactive event. In addition, the electronic source is set to an x-axis energy level that is substantially equal to the x-axis displacement signal. Also, the electronic source is set to a y-axis energy level that is substantially equal to the y-axis displacement signal. A calibration of the gamma camera is performed using the center energy level, the x-axis displacement signal and the y-axis displacement signal from the electronic source in lieu of energy signals produced by the gamma camera in response to a radioactive source during calibration.

During the calibration of the gamma camera, the center energy level, the x-axis energy level and the y-axis energy level can be scaled to predetermined energy levels that correspond to an intensity produced by the photo-multiplier in response to a predetermined radioactive event. In one embodiment, scaling the outputs of the current source via adjustment of the reference current settings of the intensity selector also scales the energy levels at the outputs of the electronic source.

DETAILED DESCRIPTION OF THE INVENTION

Figure 1:
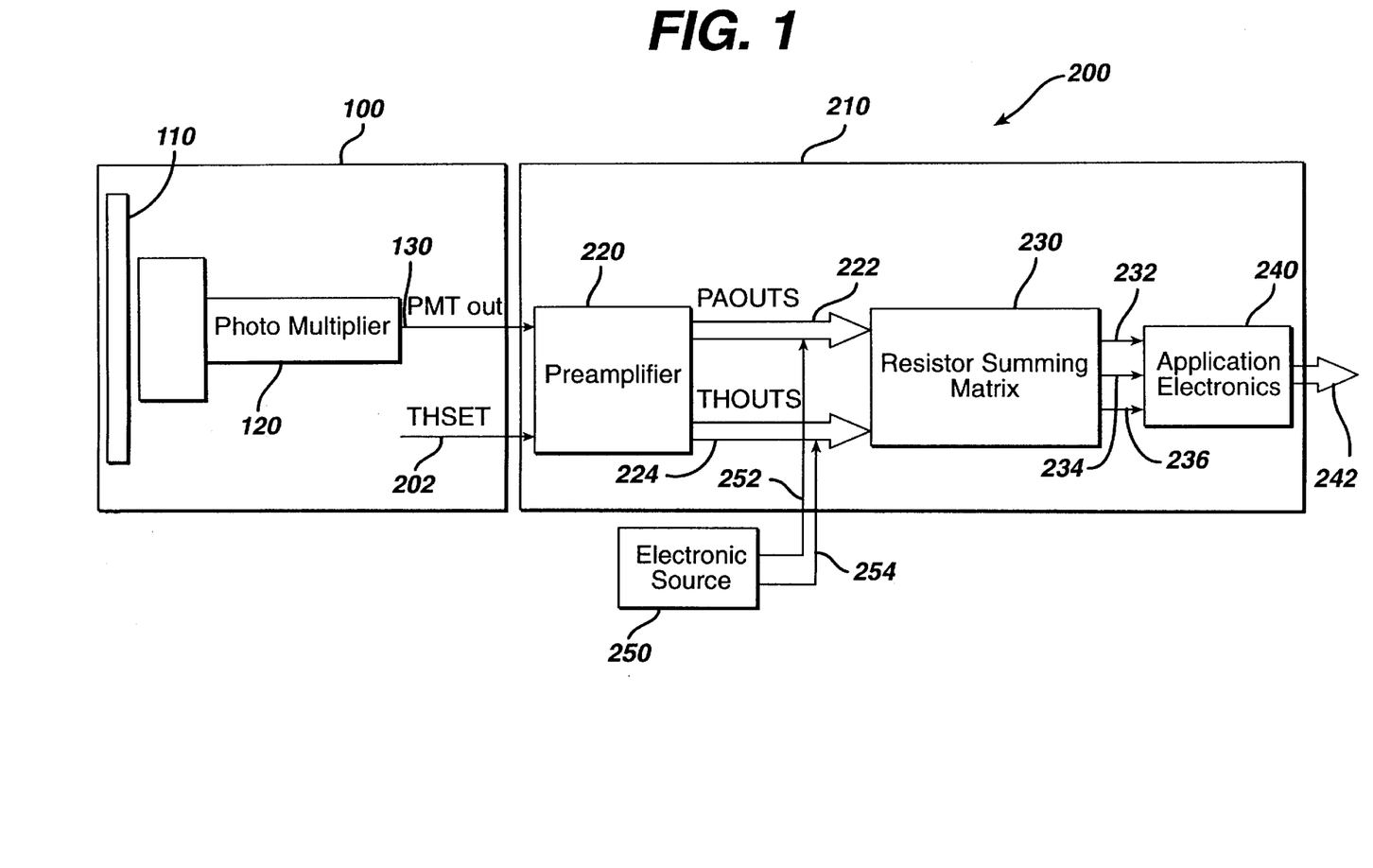
FIG. 1 is a block diagram showing an exemplary embodiment of an electronic source used in calibrating a gamma camera.

As shown in FIG. 1, a gamma camera detector 100 is included in a gamma camera 200. In this embodiment, the gamma camera detector 100 detects radioactive energy from radioactive material that has been placed, for example, in the bloodstream of a patient by medical personnel to perform various medical tests on the patient. It should be appreciated that the gamma camera 200 can comprise, for example, a medical device. It should also be appreciated that the gamma camera 200 be used in other devices within or outside the medical arts, and the apparatus and method disclosed herein expressly encompass the use of the gamma camera 200 with these other devices.

In FIG. 1, the gamma camera detector 100 is connected to device electronics 210. In one embodiment, the gamma camera detector 100 includes a scintillation crystal 110 positioned above a photo-multiplier 120 having photomultiplier output 130. A pre-amplifier 220 of the device electronics 210 is connected to the pre-amplifier output 130 and a threshold set signal 202. In this embodiment, the threshold set signal 202 is provided to set the intensity level threshold of the signals that are detected by the gamma camera detector 100. It should be appreciated that in another embodiment, the pre-amplifier 220 can be included in the gamma camera detector 100.

The pre-amplifier 220 has a pre-amplifier output 222 and a threshold output 224 that are connected to a resistor summing matrix 230. It should be appreciated that, in one embodiment, the pre-amplifier output 222 and the threshold output 224 comprise a plurality of outputs. Application electronics 240 are connected to the resistor summing matrix 230 via an x-axis output 232, a y-axis output 234 and an intensity output 236. The application electronics 240 includes device output 242 that can be connected to other electronics (not shown), such as, for example, a microprocessor, electronic and/or magnetic storage devices, video terminals and the like.

In operation, the scintillation crystal 110 absorbs the radioactive energy produced from a radioactive event that occurs near the gamma camera detector 100. A radioactive event can comprise, for example, the placement of a radioactive source (not shown) on or near the scintillation crystal 110 of the gamma camera detector 100. The scintillation crystal 110 converts the absorbed radioactive energy into energy signals that are detected by the photo-multiplier 120 that produces electrical signals in response to the energy signals. In one embodiment, the energy signals comprise an electrical current signal and/or and electrical voltage signal. The electrical signals from the photo-multiplier 120 correspond to intensity and position signals relating to the radioactive material. The pre-amplifier 220 amplifies the electrical signals and supplies the amplified electrical signals to the resistor summing matrix 230 via the threshold output 224. The photo-multiplier 120 also provides trigger signals to the pre-amplifier 220 which, in turn, provides the trigger signals to the resistor matrix 230 and the application electronics 240 via pre-amplifier output 222. The trigger signals notify the application electronics 240 that a radioactive event has been detected by the gamma camera detector 100, and the trigger signals trigger the application electronics 240 to interpret the electrical signals produced by the photo-multiplier 120.

The gamma camera 200 is calibrated such that all the readings and/or data collected that relates to the radioactive material are accurate. In one exemplary embodiment, an electronic source 250 is used during calibration of the gamma camera 200 in lieu of using a known radioactive source. During calibration, the electronic source 250 is connected to replace the pre-amplifier output 222 and the threshold output 224, and the electronic source 250 simulates the electrical signals that would be produced by the photo-multiplier 120 when the known radioactive source is placed on or near the scintillation crystal 110 of the gamma camera detector 100.

Figure 3:
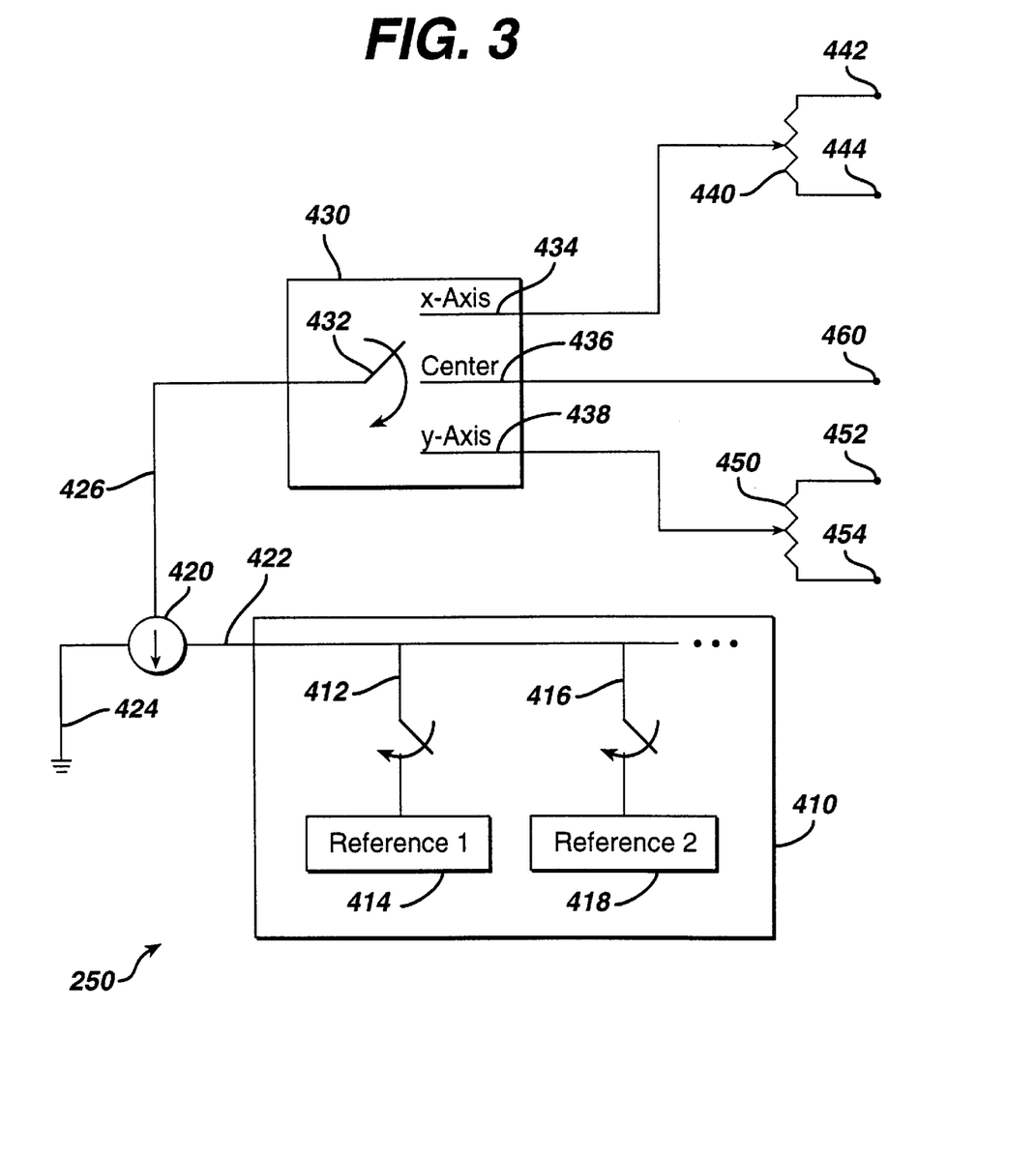
FIG. 3 is a circuit diagram of an exemplary embodiment of an electronic source.

As shown in FIG. 1, the electronic source 250 includes a first electronic source output 252 and a second electronic source output 254. In one embodiment, the first electronic source output 252 is connected to trigger electronics 600 (FIG. 4), and the second electronic source output 254 is connected to electronic source 250, as shown in FIG. 3. During calibration of the gamma camera 200, in one embodiment, the trigger electronics 600 (FIG. 4) is connected to replace the pre-amplifier output 222. The trigger electronics 600 (FIG. 4) simulate the trigger signals from the photomultiplier 120 that notify the application electronics 240 that a radioactive event has been detected by the gamma camera detector 100. In addition, the simulated trigger signals trigger the application electronics 240 to interpret the electrical signals that are produced by the electronic source 250. Also, the electronic source 250, as shown in FIG. 3, is connected to replace the threshold output 224. In this embodiment, the electronic source 250 simulates the electrical signals produced by the photo-multiplier 120 that relate to the intensity and physical location of the radioactive material relative to the gamma camera detector 100.

Figure 4:
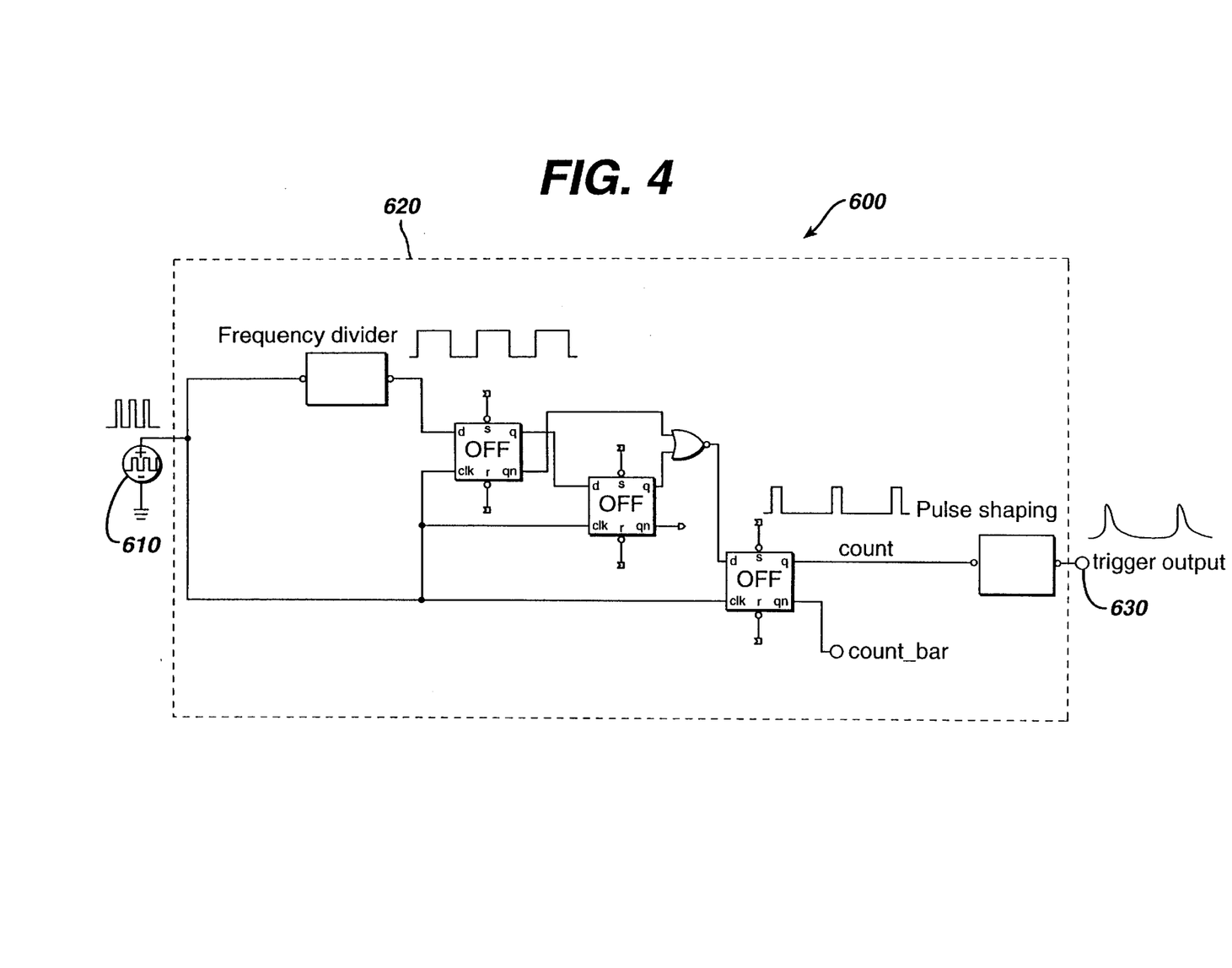
FIG. 4 is a circuit diagram of an exemplary embodiment of trigger electronics used with an electronic source.

In one embodiment, as shown in FIG. 4, the electronic source 250 includes trigger electronics 600 that are connected to replace the pre-amplifier output 222 during calibration. In this embodiment, the trigger electronics 600 include a trigger signal source 610 connected to signal processing electronics 620 having a trigger output 630. It should be appreciated that, in one embodiment, the trigger signal source 610 can comprise a power source, and in another embodiment, the trigger signal source 610 can comprise a clock/oscillator. In one embodiment, the first electronic source output 252 (FIG. 1) and the trigger output 630 are the same output. The signal processing electronics 620 process the electrical signal from the trigger power source 610 to produce a trigger signal that simulates the trigger signal that is interpreted by the application electronics 240 (FIG. 1). In one embodiment after triggering, the application electronics 240 begin an integration process that integrates the signals from the x-axis output 232, the y-axis output 234 and the intensity output 236. To simulate the trigger signal, the signal processing electronics 620 produce trigger signals that closely resemble the electronic characteristics of the trigger signal produced by the photo-multiplier 120 when a radioactive event occurs on or near the scintillation crystal 110 of the gamma camera 100. In one embodiment, the electrical characteristics of the trigger signals include, for example, rise time, energy level, event spacing to avoid pile up and event rate. It should be appreciated that the signal processing electronics 620 can be adjusted to produce trigger signals that are specific to the gamma camera 200 that is being calibrated. In one embodiment, the trigger signals comprise an electrical current signal and/or an electrical voltage signal.

In another embodiment, instead of using the trigger electronics 600, the trigger signals are produced by using an available radioactive source that is placed on or near the scintillation crystal 110. The placing of the available source triggers the application electronics 240 to interpret the electrical signals produced by the electronic source 250. As stated above, after triggering, the application electronics 240 begin an integration process that integrates the signals from the x-axis output 232, the y-axis output 234 and the intensity output 236. The location of the radioactive source with relation to the scintillation crystal 110 is not critical since the radioactive source is used only to produce the trigger signals. Likewise, the intensity of the radioactive source used for triggering is not critical. In any event, it should be appreciated that, before triggering and calibrating, the gamma camera 200 should be set to accept incoming radiation by selecting the available source energy. In addition, the gamma camera 200 should be set to accept a window of valid energy and/or radioactive intensity levels that include at least the energy and/or radioactive intensity levels of the available radioactive source.

Figure 2:
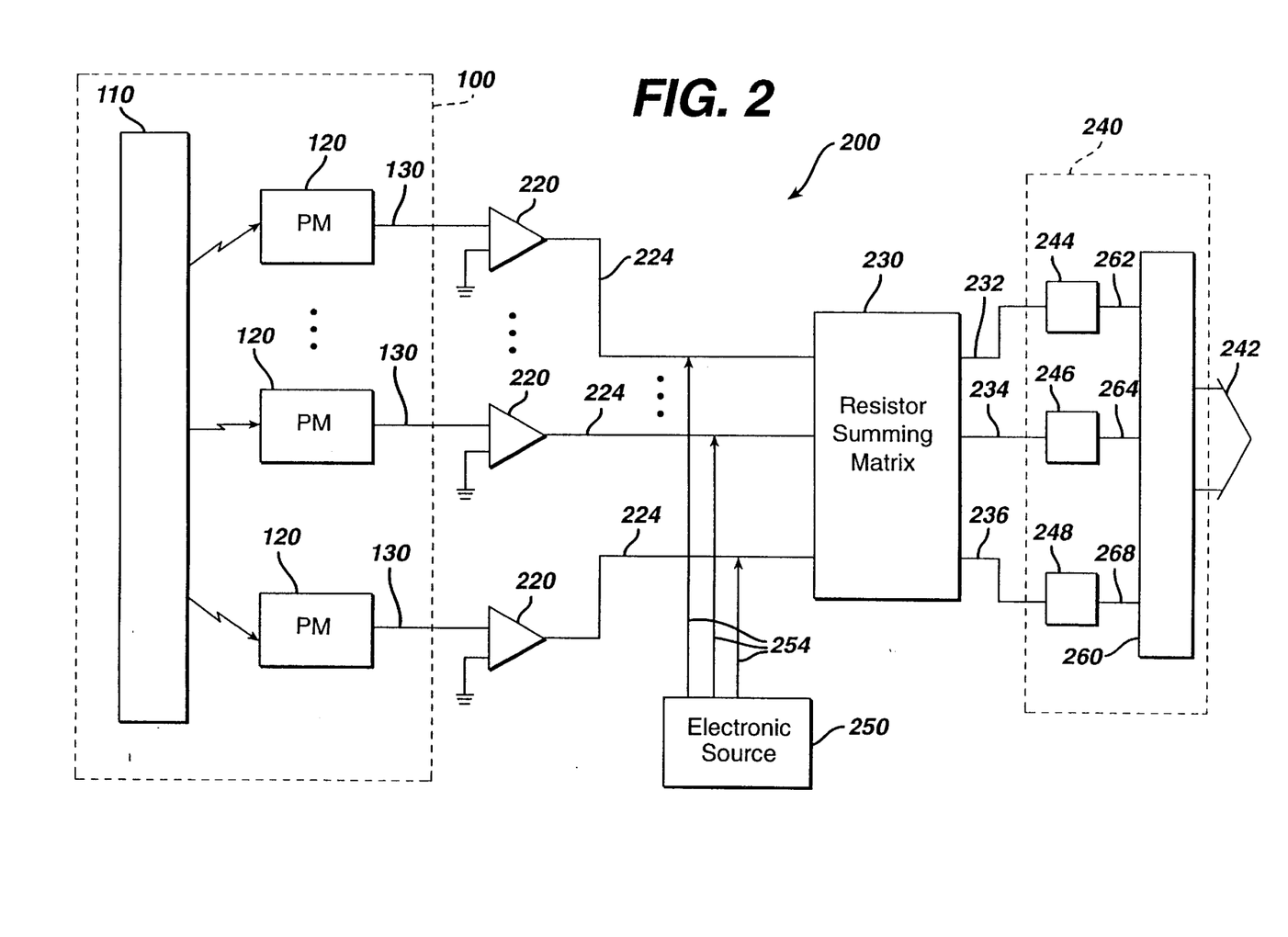
FIG. 2 is a circuit diagram of an exemplary embodiment of an electronic source used in calibrating a gamma camera.

In another embodiment, as shown in FIG. 2, the gamma camera detector 100 includes a scintillation crystal 110 positioned above an array of photo-multipliers 120, and each photo-multiplier 120 has a photo-multiplier output 130 connected to pre-amplifiers 220 having threshold outputs 224. A resistor summing matrix 230 is connected to the threshold outputs 224, x-axis output 232, y-axis output 234 and an intensity output 236. In this embodiment, the application electronics 240 include an x-axis integrator/sample and hold circuit 244, a y-axis integrator/sample and hold circuit 246 and an intensity integrator/sample and hold circuit 248 coupled to x-axis output 232, y-axis output 234 and intensity output 236, respectively. Additional device electronics 260 are connected between the device output 242, the first output 262, the second output 264 and the third output 268. It should be appreciated that the resistor summing matrix 230 and the application electronics 240 manipulate the electrical signals provided by the array of photo-multipliers 120 to produce signals that indicate the position and intensity of the radioactive materials. In addition, other devices having different configurations than the resistor summing matrix 230 and the application electronics 240 which provide the same function can be used and are expressly encompassed herein.

Figure 5:
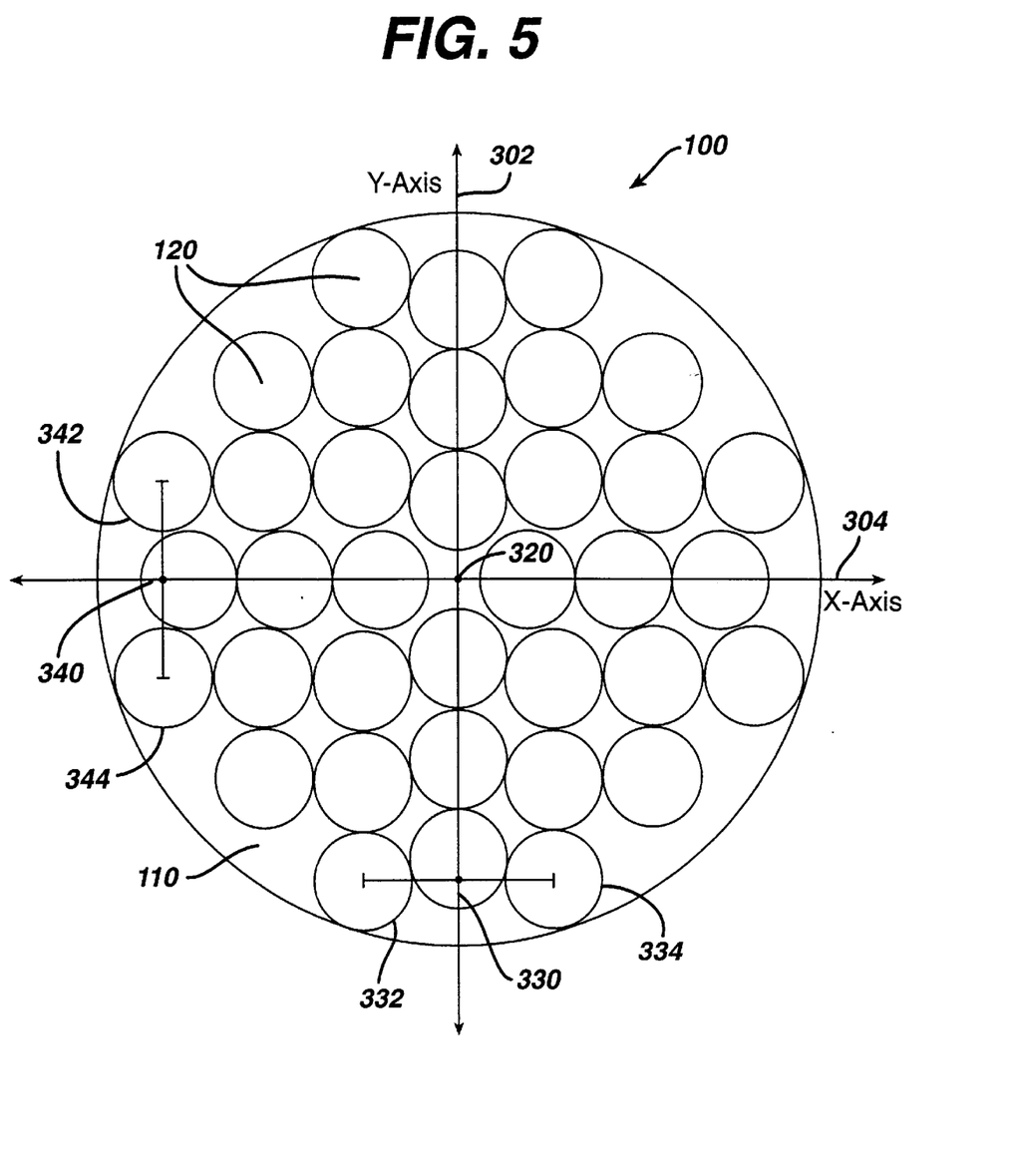
FIG. 5 is a top view of a gamma camera detector showing exemplary center, x-axis and y-axis photo-multiplier locations and radioactive source locations used in calibration of the gamma camera.

In operation, the resistor summing matrix 230 comprises an array of resistors that produce an x-axis output 232, y-axis output 234 and intensity output 236 that reflect the displacement of the electrical signals from the array of photo-multipliers 120. The electrical signals are weighted by the resistor summing matrix 230 to provided the positional location of the radioactive source given the geometric arrangement of the photo-multipliers 120, as shown in FIG. 5. The electrical signals from the x-axis output 232, y-axis output 234 and intensity output 236 are, respectively, integrated by the x-axis integrator/sample and hold circuit 244, the y-axis integrator/sample and hold circuit 246 and the intensity integrator/sample and hold circuit 248, respectively. The integrated electrical signals from the x-axis integrator/sample and hold circuit 244, the y-axis integrator/sample and hold circuit 246 and the intensity integrator/sample and hold circuit 248 are respectively supplied to the first output 262, second output 264 and third output 268 of the application electronics 240. The signals from the first output 262, second output 264 and third output 268 are used to determine the intensity of the radioactive event and the spatial distribution of the radioactive event. It should be appreciated that the outputs 232–236 and the integrator/sample and hold circuits 244–248 comprise one embodiment, and other embodiments include devices that perform the same function using different electronic configurations, and these other devices are expressly encompassed herein.

As explained above, during calibration, an electronic source 250 is connected via second electronics source outputs 254 to replace the threshold outputs 224 of the pre-amplifiers 220. In this embodiment, the second electronic source outputs 254 comprise a plurality of lines that are connected individually to replace each of the threshold outputs 224. The electronic source 250 produces electrical signals that simulate the electrical signals produced by the photo-multiplier 120 when a known radioactive source is placed on or near the scintillation crystal 110 during calibration. In this manner, a number of known radioactive sources are not required during calibration of the gamma camera 200. In one embodiment, the electrical signals produced by the electronic source 250 comprise an electrical current signal and/or an electrical voltage signal.

In one embodiment, shown in FIG. 3, the electronic source 250 comprises an energy source 420. In a preferred embodiment, the energy source 420 comprises a programmable current source producing a predetermined current. The energy source 420 is connected to a ground connection 424, an energy source output 426 and an energy source reference input 422. The energy source reference input 422 is connected to an intensity selector 410 that includes a first switch 412 and a second switch 416. The first switch 412 is connected to a first reference setting 414, and the second switch 416 is connected to a second reference setting 418. The first and second reference settings 414 and 418 represent different energy level settings for the energy source 420 that correspond to the intensity levels of different predetermined radioactive sources. In another embodiment, the energy source 420 comprises control electronics and/or energy adjust electronics (not shown) and the first and second reference settings 414 and 418 that provide energy settings interpreted by the control electronics and/or energy adjust electronics (not shown) of the energy source 420. The energy level settings provide information relating to a predetermined energy level that is to be supplied by the energy source 420 via the energy source output 426. In even another embodiment, the control electronics and/or energy adjust electronics (not shown) of the energy source 420 provide an energy level based on a resistive input. As such, in this embodiment, the first and second reference settings 414 and 418 comprise predetermined resistor values. In another embodiment, the first and second reference settings 414 and 418 contain programmed instructions that can be interpreted by the energy source 420. It should be appreciated that other embodiments of the intensity selector 410 can include more than two switches 412 and 414 and, thus, more than two reference settings 414 and 418.

In the embodiment shown in FIG. 3, the energy source output 426 is connected to a position selector 430 that comprises a position selector switch 432 having an x-axis position 434, a y-axis position 438 and a center position 436. The x-axis position 434 is connected to an x-axis potentiometer 440 having a first x-axis output 442 and a second x-axis output 444. The y-axis position 438 is connected to a y-axis potentiometer 450 having a first y-axis output 452 and a second y-axis output 454. The center position 436 is connected to a center output 460. It should be appreciated that in other embodiments the position selector switch 432 can have more or fewer connective positions 434–438 than those shown in FIG. 4. In addition, in one embodiment, the first x-axis output 442, the second x-axis output 444, the first y-axis output 452, the second y-axis output 454 and the center output 460 comprise the second electronic source outputs 254, as shown in FIG. 2. In one embodiment, the energy weighting device comprises the position selector 430, the position selector switch 432, the x-axis potentiometer 440 and the y-axis potentiometer 450 that are connected as explained herein. It should be appreciated that, in another embodiment, the energy weighting device can comprise devices that provide signals to the gamma camera 200 that simulate a radioactive event on or near the scintillation crystal 110. In even another embodiment, the intensity selector 410 comprises at least the first switch 412, first reference setting 414, the second switch 416 and the second reference setting 418 that are connected as explained herein. It should be appreciated that in other embodiments the intensity selector 410 comprises devices that provide reference settings to the energy source 420 to produce energy signals that simulate a radioactive event on or near the scintillation crystal 110. In addition, it should be appreciated that, in yet another embodiment, the intensity selector 410 can be included in the energy source 420.

In one embodiment, as shown in FIGS. 1 and 2, the electronic source 250 and the trigger electronics 600 are separate from the gamma camera 200. This embodiment of the electronic source 250 can be used with existing gamma camera 200. However, newly manufactured gamma camera 200 can include the electronic source 250 and/or the trigger electronics 600 as part of the device electronics 210 and/or gamma camera detector 100. Therefore, in this embodiment, the electronic source 250 is included as part of the gamma camera 200 and/or as part of the gamma camera detector 100, and this embodiment is expressly encompassed herein.

As discussed above, the electronic source 250 produces electrical signals, such as, for example, electrical current to simulate the electrical signals produced by the photomultiplier tube 120 when a radioactive event is detected by the gamma camera detector 100. During calibration of the gamma camera 200, the electronic source 250 must be set or adjusted to simulate the electrical signals produced by a radioactive source that is used during a conventional calibration. To set and/or adjust the electronic source 250, an available radioactive source is placed at various positions on or near the scintillation crystal 110, as shown in FIG. 5. At these various positions, the electronic source 250 is adjusted to simulate the electrical signals produced by the photomultipliers 120 in response to the available radioactive source. After the electronic source 250 is adjusted, the gamma camera 200 is calibrated using the electronic source 250 in lieu of using a number of radioactive sources having varying radioactive intensities.

In one embodiment, of the gamma camera 200 as shown in FIG. 1, the gamma camera 200 comprises separate pre-amplifier outputs 222 and threshold outputs 224. In this embodiment, as discussed herein, the pre-amplifier outputs 222 supply the trigger signals to the application electronic 240 and the threshold outputs 224 supply the energy signals from the photo-multiplier 120 to the application electronics 240. Since in this embodiment the pre-amplifier outputs 222 and the threshold outputs 224 are separate, the trigger signal produced by the trigger electronics 600 and supplied via the first electronic source output 252 to replace the pre-amplifier outputs 222 needs to be process to accurately simulate a radioactive event. Also, the energy signals produced by the electronic source 250 and supplied to replace the threshold outputs 224 via the second electronic source outputs 254 can comprise, for example, a direct current signal. The direct current signal can be used because the application electronics 240 only integrate the energy signal from the electronics source 250 after being triggered. In another embodiment, as shown in FIG. 2, the gamma camera 200 has a threshold output 224. In this embodiment, the application electronics 240 relies on the threshold outputs 224 for triggering and for supplying the energy signals relating to the radioactive event. Therefore, the energy signals produced by the radioactive source 250 via the second electronic source output 254 to replace the threshold outputs 224 must be process to accurately simulate the energy signals produced by the photo-multipliers 120 during a radioactive event.

Figure 6:
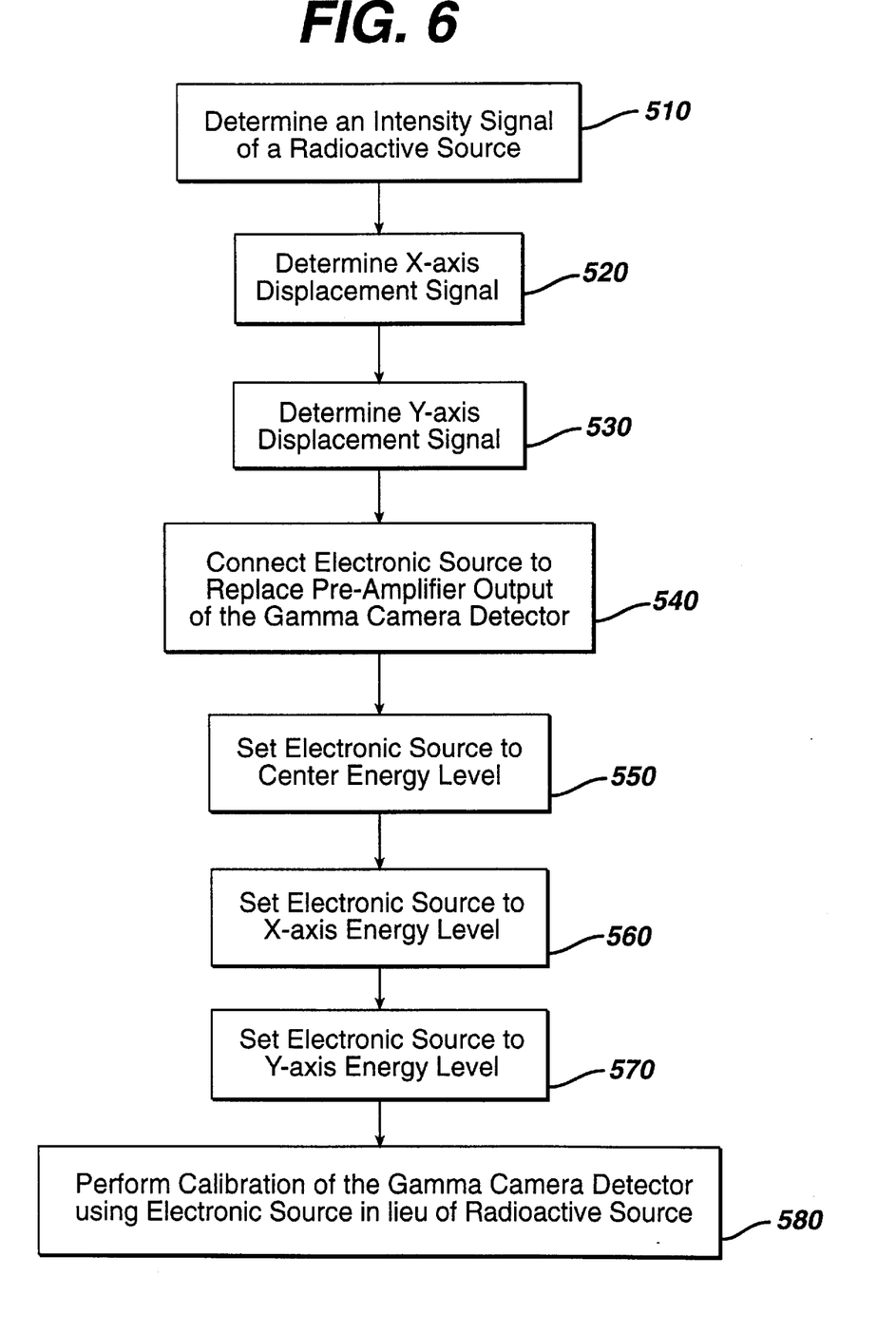
FIG. 6 is a flow chart of an exemplary embodiment of a method for calibrating a gamma camera using an electronic source.

In one embodiment, the electronic source 250 is adjusted with a radioactive source available at the facility housing the gamma camera 200. The adjusting of the electronic source 250 involves determining an intensity value of a radioactive source positioned proximate to the scintillation crystal 110 (step 510). In this embodiment, the proximate positioning places the radioactive source on or near the scintillation crystal 110. In another embodiment, the intensity value comprises an uncalibrated intensity value. In even another embodiment, when the electronic source 250 is adjusted to the uncalibrated intensity, the electronic source 250 is not adjusted to compensate for uncalibrated spatial and/or intensity readings inherent in the gamma camera 200. Instead, the electronic source 250 is adjusted to simulate the spatial and/or intensity readings produced by an uncalibrated gamma camera 200 in response to the radioactive source. Any erroneous spatial and/or intensity reading will be corrected during calibration of the gamma camera 200.

As discussed above, in FIG. 5, the photo-multipliers 120 are arranged in a geometric array. It should be appreciated that in other embodiments the geometric array of photomultipliers 120 comprises different shapes other than circular. An x-axis 304 and a y-axis 302 are provided in FIG. 5 to illustrate a center location 320, an x-axis location 340 and a y-axis location 330 in the array of photo-multipliers 120.

During the determination of the intensity value of the radioactive source (step 510), the radioactive source is placed at the center location 320. An energy meter (not shown), such as, for example, a voltage meter, is connected to the first output 262, the second output 264 and the third output 268 to measure the energy signals produced when the radioactive source is at the center location 320. From the measured energy signals, the intensity signal of the radioactive source is determined (step 510). In addition, an x-axis displacement signal is determined by placing the radioactive source at the x-axis location 340 (step 520). Again, the energy meter is connected to the first output 262, the second output 264 and the third output 268 to measure the energy signals produced when the radioactive source is at the x-axis location 340.

From the measured energy signals, the x-axis displacement signal is determined (step 520). Also, a y-axis displacement signal can be determined by placing the radioactive source at the y-axis location 330 (step 530). The energy meter is connected to the first output 262, the second output 264 and the third output 268 to measure the energy signals produced when the radioactive source is at the y-axis location 330. In another embodiment, the energy meter is connected to only one of the first output 262, the second output 264 and the third output 268, and the electronic source 250 is adjusted according to a measurement at each position. In this embodiment, when the radioactive source is at the x-axis position 340, the y-axis signal is substantially zero. In addition, when the radioactive source is at the y-axis position 330, the x-axis signal is substantially zero. Also, when the radioactive source is at the center position 320, the x-axis signal and the y-axis signal are substantially zero. Therefore, when adjusting the electronic source 250, only one output at each position needs to be measured. From the measured energy signals, the y-axis displacement signal is determined (step 530). It should be appreciated that, in one embodiment, the positioning of the radioactive source at the center, x-axis and y-axis locations 320, 340 and 330, respectively, is provided by calibration techniques outlined by the manufacturer of the gamma camera 200 and/or the gamma camera detector 100. It should also be appreciated that, in another embodiment, the positioning of the radioactive source at the center, x-axis and y-axis locations 320, 340 and 330, respectively, can be accomplished by a technician using experience and/or skill in the art.

After the intensity signal, the x-axis displacement signal and the y-axis displacement signal are determined, the electronic source 250 is connected to replace the threshold outputs 224 of the pre-amplifier (step 540). Once connected, the electrical signals provided by the electronic source 250 are interpreted by the resistor summing matrix 230 and the application electronics 240 as being produced by the photo-multipliers 120 in response to radioactive material positioned on or near the scintillation crystal 110. As discussed previously, the application electronics 240 are appropriately triggered to interpret the electrical signals produced by the electronic source 250.

After being connected to replace the threshold outputs 224, the electronic source 250 is set to the determined energy signals from the steps discussed above. The electronic source 250 is set to the center energy level that corresponds to the determined energy level of the intensity signal of the radioactive source (step 550). To set the center energy level, the position selector switch 432 of the electronic source 250 is also placed at the center position 436. The electronic source 250 is set to the energy level provided from determining the intensity signal of the radioactive source (step 510). In setting the electronic source 250, the first reference setting 414 and/or the second reference setting 418 are set to such that the energy source 420 produces an energy signal at the first output 262, the second output 264 and the third output 268 that is substantially equal to the determined energy signals produced during step 510. In addition, the electronic source 250 is set to an x-axis energy level (step 560). To set the x-axis energy level, the position selector switch 432 of the electronic source 250 is placed at the x-axis position 434. The x-axis potentiometer 440 is adjusted until the energy signals at the first output 262, the second output 264 and the third output 268 are substantially equal to the x-axis displacement signal determined in step 520. Also, the electronics source 250 is set to a y-axis energy level (step 570). To set the y-axis energy level, the position selector switch 432 of the electronic source 250 is placed at the y-axis position 438. The y-axis potentiometer 450 is adjusted until the energy signals at the first output 262, the second output 264 and the third output 268 are substantially equal to the y-axis displacement signal determined in step 530. It should be appreciated that, in one embodiment, at each position that the radioactive source is placed some of the outputs are substantially zero. Therefore, only the non-zero outputs need to be set at each position when setting the electronic source 250.

It should be appreciated that since the intensity value of the radioactive source is translated into an energy level, the electronic source 250 can be scaled so that the electronic source 250 resembles any predetermined radioactive source, such as, for example, americium (Am), cobalt (Co) and technetium (Tc). To scale the energy level produced, the electronic source 250 includes the intensity selector 410 that can be used to adjust the energy levels produced by the energy source 420. The first reference setting 414 and the second reference setting 418 can be scaled to produce energy levels that correspond to the intensity levels of any predetermined radioactive sources. As such, since the electronic source 250 can scale the energy level of the energy source 420, a number of radioactive sources having varying intensity values do not have to be transported to perform the calibration.

After the electronic source 250 is set, the gamma camera 200 is calibrated (step 580) using the electronic source 250 in lieu of using a radioactive source. The calibration of the gamma camera 200 is performed using steps outlined by the manufacturer of the gamma camera 200 and/or the gamma camera detector 100 except the electronic source 250 is used instead of a radioactive source. In another embodiment, a technician using skills and techniques in the art can calibrate the gamma camera detector 100 and/or the gamma camera 200, again, with the exception that the electronic source 250 is used instead of a radioactive source. Further, it should be appreciated that after the electronic source 250 has been adjusted using the radioactive source, several calibrations of the gamma camera detector 100 and/or gamma camera 200 can be performed without having to re-adjust the electronic source 250 using the radioactive source. A periodic re-adjustment (steps 510–570) of the electronic source 250 is performed to account for and correct any error associated with electronic drift and other factors associated with the gamma camera detector 100 and/or the gamma camera 200.

As explained earlier, it should be appreciated that the radioactive source comprises, in one embodiment, an available radioactive source at the physical location of the gamma camera 200. Typically, the gamma camera 200 are located in a hospital or other medical facility, and radioactive sources that are kept in the hospital or medical facility for other applications can be used to adjust the electronic source 250. By using the electronic source 250 for calibration, a technician is not required to transport radioactive sources in order to calibrate the gamma camera 200. In another embodiment, the technician can transport one radioactive source to perform the calibration, and the radioactive source that is carried is chosen such that the governmental regulations regarding transportation of the chosen radioactive sources are minimal. Therefore, costs associated with the storage and transportation are minimal.

The foregoing discussion of the invention has been presented for purposes of illustration and description. Further, the description is not intended to limit the invention to the form disclosed herein. Consequently, variations and modifications commensurate with the above teachings, and with the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for calibrating a gamma camera having at least one photomultiplier, said apparatus comprising:
    an electrical calibration source providing an electrical output;
    an intensity selector connected to said electrical calibration source for adjusting said electrical output to a predetermined electrical output level corresponding to an intensity of a predetermined radioactive source; and
    an electrical weighting device connected to said electrical calibration source and at least one output of the at least one photomultiplier of said gamma camera, said electrical weighting device creating electrical calibration signals from said electrical output of said electrical calibration source, said electrical calibration signals being supplied to the at least one output of the at least one photomultiplier of said gamma camera and used during calibration of said gamma camera in lieu of energy signals produced by said gamma camera in response to a radioactive source.

2. The apparatus of claim 1 wherein said electrical calibration source comprises a programmable current source.

3. The apparatus of claim 1, further comprising a reference setting selectively coupled to said electrical calibration source for instructing said electrical calibration source to produce said predetermined electrical output level.

4. The apparatus of claim 1 wherein said electrical weighting device comprises at least one potentiometer connected to said electrical calibration source for producing a ratio of electrical output signals, wherein said ratio of electrical output signals comprises said electrical calibration signals.

5. The apparatus of claim 4 wherein said electrical weighting device further comprises a position selector switch for selectively coupling said at least one potentiometer to said electrical calibration source.

6. The apparatus of claim 1, further comprising trigger electronics selectively coupled to said gamma camera, said trigger electronics supplying a trigger current to said gamma camera for triggering said gamma camera to interpret said electrical calibration signals in lieu of the energy signals produced by the radioactive source.

7. An apparatus for calibrating a gamma camera having a scintillation crystal positioned above a photo-multiplier connected to a pre-amplifier having an electrical output, said apparatus comprising:
    a current source for producing a predetermined current signal representative of an intensity of a predetermined radioactive source positioned proximate to said scintillation crystal;
    an intensity selection switch connected to said current source and adjustable to a conductive position;
    a reference current setting connected to said intensity selection switch and supplied to said current source when said intensity selection switch is adjusted to said conductive position, said reference current setting instructing said current source to produce said predetermined current signal;
    a position selector switch connected to said current source and receiving said predetermined current signal, said position selector switch comprising a plurality of connective positions, a first of said plurality of connective positions supplying said predetermined current signal to a first output of said apparatus;
    a first potentiometer connected to a second of said plurality of connective positions and producing a first ratio of current signals from said predetermined current signal, said first ratio of current signals supplied to a second output of said apparatus; and
    a second potentiometer connected to a third of said plurality of connective positions and producing a second ratio of current signals from said predetermined current signal, said second ratio of current signals supplied to a third output of said apparatus,
    said first output, said second output and said third output connected to replace said electrical output of said pre-amplifier during calibration of said gamma camera and supplying said predetermined current signal, said first ratio of current signals and said second ratio of current signals in lieu of energy signals produced by said gamma camera in response to said radioactive source during calibration.

8. The apparatus of claim 7 wherein said current source comprises a programmable current source.

9. The apparatus of claim 7 wherein said current source further comprises current adjust electronics connected to said intensity selection and receiving said reference current setting, said current adjust electronics adjusting said current source to produce said predetermined current signal in response to said reference current setting.

10. The apparatus of claim 7 wherein said electrical output of said preamplifier comprises a pre-amplifier output and a threshold output, said first output, said second output and said third output being connected to replace said threshold output of said pre-amplifier during calibration of said gamma camera.

11. The apparatus of claim 10, further comprising trigger electronics connected to replace said pre-amplifier output of said pre-amplifier during calibration of said gamma camera, said trigger electronics supplying a trigger signal to said gamma camera to interpret said predetermined current signal, said first ratio of current signals and said second ratio of current signals in lieu of the energy signals produced by the radioactive source during calibration of said gamma camera.

12. The apparatus of claim 7 wherein said electrical output of said pre-amplifier is connected to a resistor summing matrix and said first output, said second output and said third output being connected to replace said electrical output between said pre-amplifier and said resistor summing matrix during calibration of said gamma camera.

13. The apparatus of claim 7 wherein said first potentiometer produces said first ratio of current signals to represent an x-axis position of said predetermined radioactive source proximate to said scintillation crystal.

14. The apparatus of claim 7 wherein said second potentiometer produces said second ratio of current signals to represent a y-axis position of said predetermined radioactive source proximate to said scintillation crystal.

15. The apparatus of claim 7 wherein said predetermined radioactive source comprises a radioactive source selected from the group consisting of americium (Am), cobalt (Co) and technetium (Tc).

16. A method for calibrating a gamma camera having at least one photomultiplier, said method comprising the steps of;
   connecting an electrical calibration source to at least one output of the at least one photomultiplier of said gamma camera:
   adjusting said electrical calibration source to produce simulated radioactive energy electrical signals that approximately duplicate electrical characteristics of a radioactive source;
   electrically weighting the simulated radioactive energy electrical signals using said electrical calibration source and supplying the simulated radioactive energy electrical signals to the at least one output of the at least one photomultiplier of said gamma camera; and
   performing a calibration of said gamma camera using said simulated radioactive energy electrical signals from the adjusted electrical calibration source in lieu of energy signals produced by said gamma camera in response to a radioactive source.

17. The method of claim 16 wherein said step of adjusting comprises the steps of:
   determining an intensity signal of a radioactive source positioned proximate to said scintillation crystal;
   determining an x-axis displacement signal corresponding to an x-axis position of the radioactive source proximate to a scintillation crystal of said gamma camera;
   determining a y-axis displacement signal corresponding to a y-axis position of the radioactive source proximate to said scintillation crystal;
   setting said electrical calibration source to a center energy level substantially equal to said intensity signal of the radioactive source;
   setting said electrical calibration source to an x-axis energy level substantially equal to said x-axis displacement signal; and
   setting said electrical calibration source to a y-axis energy level substantially equal to said y-axis displacement signal,
   wherein said center energy level, said x-axis energy level and said y-axis energy level comprise said simulated radioactive energy electrical signals.

18. The method of claim 16, further comprising the step of triggering said gamma camera to interpret said simulated radioactive energy electrical signals in lieu of energy signals produced by the radioactive source.

19. The method of claim 16 wherein said step of connecting said electrical calibration source to the at least one photomultiplier of said gamma camera comprises connecting said electrical calibration source to replace an electrical at least one output of a pre-amplifier connected to the photo-multiplier of said gamma camera.

20. A method for calibrating a gamma camera having a scintillation crystal positioned above a photo-multiplier connected to a pre-amplifier having an electrical output, said method comprising the steps of:
   determining an intensity signal of a radioactive source positioned proximate to said scintillation crystal;
   determining an x-axis displacement signal corresponding to an x-axis position of the radioactive source proximate to said scintillation crystal;
   determining a y-axis displacement signal corresponding to a y-axis position of the radioactive source proximate to said scintillation crystal;
   connecting an electronic source to replace said electrical output of said pre-amplifier;
   setting said electronic source to a center energy level substantially equal to said intensity signal of the radioactive source;
   setting said electronic source to an x-axis energy level substantially equal to said x-axis displacement signal;
   setting said electronic source to a y-axis energy level substantially equal to said y-axis displacement signal; and
   performing a calibration of said gamma camera using said center energy level, said x-axis energy level and said y-axis energy level from said electronic source in lieu of energy signals produced by said gamma camera in response to a radioactive source.

21. The method of claim 20 wherein said intensity signal of the radioactive source comprises an uncalibrated intensity signal.

22. The method of claim 20 wherein said center energy level, said x-axis energy level and said y-axis energy level comprise electrical current levels.

23. The method of claim 20 further comprising the step of scaling said center energy level, said x-axis energy level and said y-axis energy level to predetermined energy levels corresponding to a predetermined radioactive source.

24. The method of claim 20, further comprising the step of triggering said gamma camera to interpret said center energy level, said x-axis energy level and said y-axis energy level in lieu of the energy signals produced by the radioactive source.

25. The method of claim 20, wherein said electrical output of said pre-amplifier is connected to a resistor summing matrix, and said step of connecting said electronic source to replace said electrical output comprises connecting said electronic source to replace said electrical output between said pre-amplifier and said resistor summing matrix.

26. The method of claim 20 wherein the radioactive source comprises a radioactive source selected from the group consisting of americium (Am), cobalt (Co) and technetium (Tc).

* * * * *